United States Patent [19]

Tokuda et al.

[11] 4,024,445

[45] May 17, 1977

[54] CIRCUIT FOR PRODUCING FOR A FEEDBACK MOTOR SPEED CONTROL LOOP AN ERROR SIGNAL IMMUNE TO A CHANGE IN THE SOURCE VOLTAGE

[75] Inventors: Kazuo Tokuda, Tokyo; Hiroshi Minakuchi, Kadoma, both of Japan

[73] Assignees: Nippon Electric Company, Ltd.; Matsushita Electric Industrial Co., Ltd., both of Japan

[22] Filed: July 7, 1975

[21] Appl. No.: 593,269

[30] Foreign Application Priority Data

July 11, 1974 Japan .............................. 49-79952

[52] U.S. Cl. ............................... 318/318; 318/328; 318/341
[51] Int. Cl.² ............................................ H02P 5/16
[58] Field of Search ................... 318/318, 341, 328

[56] References Cited
UNITED STATES PATENTS

| | | | |
|---|---|---|---|
| 3,553,551 | 1/1971 | Arnold | 318/318 X |
| 3,681,670 | 8/1972 | Kadokura | 318/318 |
| 3,772,580 | 11/1973 | Odone | 318/318 |
| 3,803,472 | 4/1974 | Konrad | 318/318 X |

*Primary Examiner*—B. Dobeck
*Attorney, Agent, or Firm*—Ostrolenk, Faber, Gerb & Soffen

[57] ABSTRACT

A circuit for producing an error voltage for a negative feedback loop for automatic control of a motor speed comprises a monostable multivibrator triggered by a feedback signal of a frequency representative of the motor speed for generating a rectangular signal of a predetermined pulse width, a pulse height proportional to a source voltage for the multivibrator, and a duty cycle decided by the frequency. A potentiometer-integrator derives a variable voltage proportional to an average of the rectangular signal voltage. A potential divider for the source voltage derives a reference voltage indicative of a desired motor speed. A comparator derives a difference between the variable and reference voltages as the error voltage.

5 Claims, 2 Drawing Figures

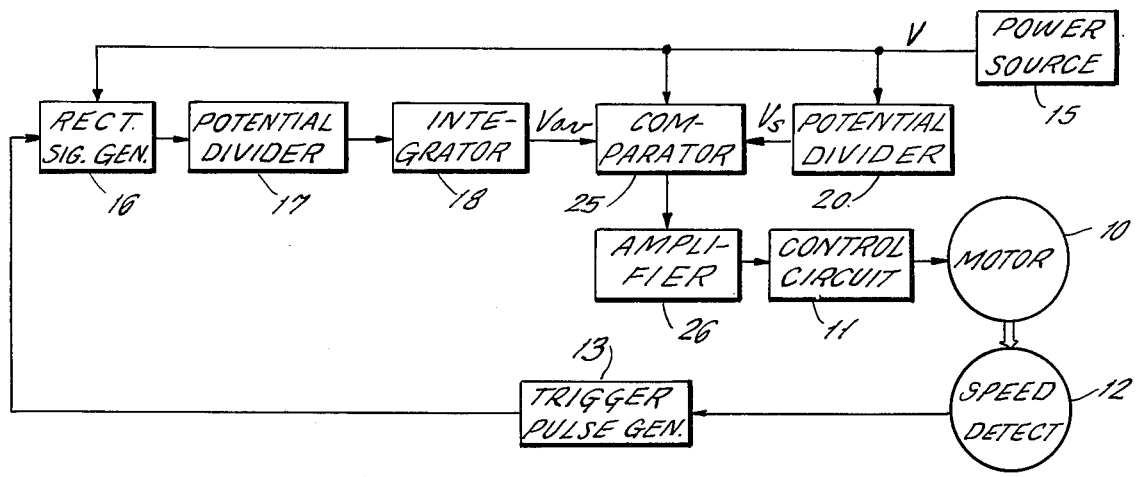
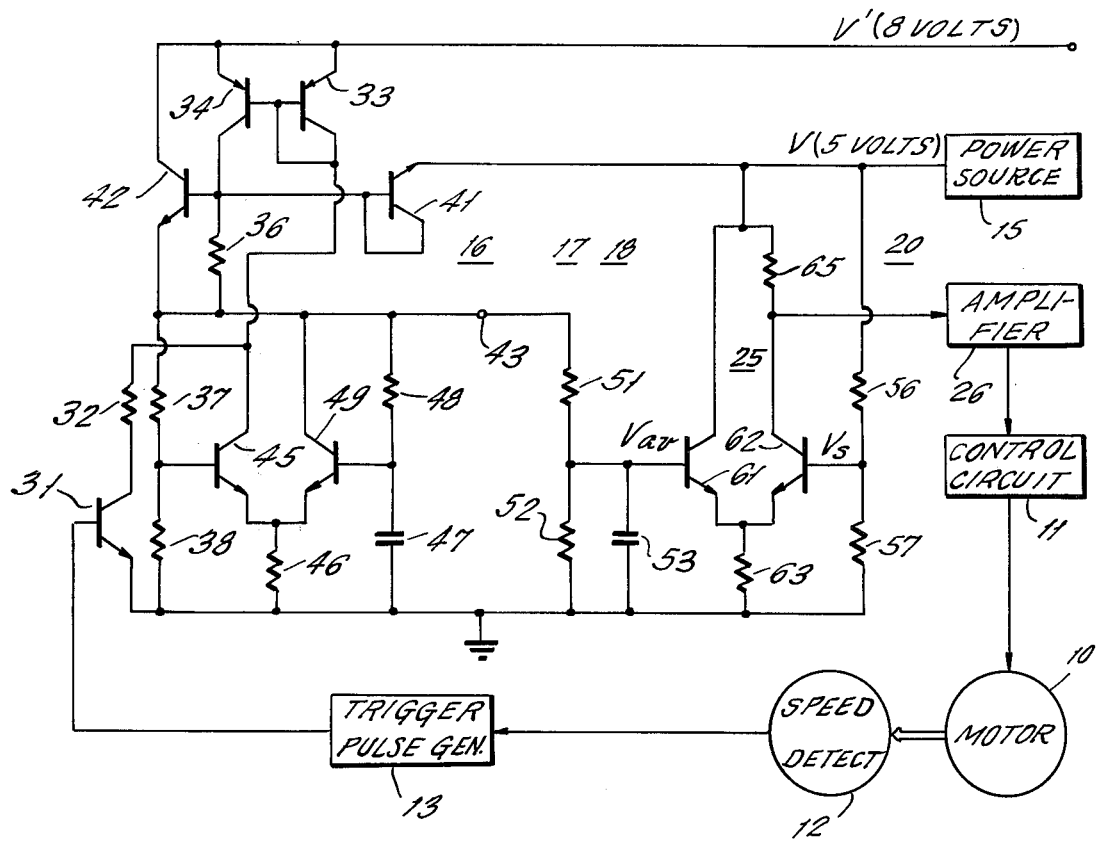

CIRCUIT FOR PRODUCING FOR A FEEDBACK MOTOR SPEED CONTROL LOOP AN ERROR SIGNAL IMMUNE TO A CHANGE IN THE SOURCE VOLTAGE

BACKGROUND OF THE INVENTION

This invention relates to a circuit for producing an error signal for use in a negative feedback loop for automatically controlling a quantity capable of being electrically controlled and represented by a frequency of a feedback signal for the loop.

In a conventional negative feedback loop of the type described, it is often the case to feed an a.c. signal of a frequency representative of an actual value of the quantity back to a rectangular pulse generator, such as a monostable multivibrator, for generating a rectangular signal of predetermined pulse width and height to control the duty cycle of the rectangular signal in compliance with the frequency. The rectangular signal is averaged by an integrator to become a variable signal of a variable d.c. voltage, which is compared with a reference signal of a fixed or adjustable reference d.c. voltage indicative of a value predetermined for the quantity. After amplification, an error representative of the difference between the tow d.c. voltages is supplied to means for electrically controlling the quantity to the predetermined value. The automatic control is thus carried out by forming for a change or fluctuation, if any, in the quantity, a negative feedback loop whose closed loop gain is used to compress or nullify the possible change or fluctuation.

It will readily be understood that the reference d.c. voltage, once set at a desired value, has to be strictly stable. The source voltage for the rectangular pulse generator should also be very stable because a fluctuation would otherwise be introduced into the rectangular signal and accordingly into the variable d.c. voltage so as to unavoidably mis-control the quantity. This is also the case with the integrator. The mis-control becomes more serious in a negative feedback loop of the type described, which has a higher closed loop gain. In order to obtain a constant source voltage, use may be made of a Zener diode or a similar constant-voltage diode. The constant voltage obtained thereby, however, is still subject to change from the strict point of view because the obtained voltage depends on the current flowing through the constant voltage diode, the ambient temperature, and others. In addition, the Zener diode is not applicable to a rectangular pulse generator operable at a source voltage of about four volts or lower because Zener diodes have excellent constant voltage and temperature characteristics only at 5 to 6 volts.

Among the quantities mentioned above, the speed, generally expressed in terms of revolutions per minute, of a d.c. motor operable by a dry battery is liable to fluctuate particularly because the terminal voltage of the battery varies in reponse to a change in the motor speed. This invention will therefore be described in the following in specific conjuction with automatic control of the speed of a motor, such as a d.c. or a.c. motor or a rotary engine, although the invention is equally well applicable to automatic control of the output frequency of a voltage-controlled oscillator and other quantities of the nature defined above.

SUMMARY OF THE INVENTION

It is consequently an object of the present invention to provide a circuit for producing an error signal for use in a negative feedback loop for automatic control of an actual speed of a motor, which is operable with a high precision despite the occurrence of a possible change or fluctuation in the source voltage for the circuit.

It is another object of this invention to provide an error signal producing circuit of the type described, wherefor it is unnecessary to carry out complicated voltage stabilization for the source voltage.

It is still another object of this invention to provide an error signal producing circuit of the type described, operable at a low source voltage that may be supplied by a dry battery of a terminal voltage of 4.5 volts.

In the manner known in the art, a negative feedback loop for automatically controlling the actual speed of a motor comprises means responsive to a control signal for controlling the actual speed, means for detecting the actual speed to produce a feedback signal of a frequency representative of the actual speed, a circuit responsive to the feedback signal for producing an error signal of an error voltage representative of a difference between the actual speed and a speed predetermined for the motor, and means for supplying the error signal to the speed control means as the control signal. In accordance with this invention, the error signal producing circuit comprises a rectangular signal generator operable the electric power of a source voltage and responsive to the feedback signal for generating a rectangular signal of a predetermined pulse width, a pulse height linearly proportional to the source voltage, and a duty cycle determined by the frequency of the feedback signal, means responsive to the rectangular signal for deriving a variable signal of a variable voltage linearly proportional to an average voltage of the rectangular signal, a potential divider for linearly dividing the source voltage to derive a reference signal of a reference voltage incicative of the predetermined speed, and means for deriving as the error voltage a difference between the variable and reference voltages.

BRIEF DESCRIPTION OF THE DRAWING

FIG. 1 is a block diagram which shows, in principle, a negative feedback loop for automatic control of a motor speed, comprising an error signal producing circuit according to the instant invention, and FIG. 2 is a schematic diagram which shows in detail, together with a negative feedback loop of the type shown in FIG. 1, an error signal producing circuit according to an embodiment of this invention.

DESCRIPTION OF THE PREFERRED EMBODIMENTS:

Referring to FIG. 1, a circuit according to the present invention is employed for producing a negative feedback loop an error signal for use in automatically controlling an actual speed of a motor 10. In the feedback loop, a conventional control circuit 11 responsive to the error signal drives the motor 10 so as to make the actual motor speed converge to a predetermined speed. A known speed detector 12 generates an a.c. signal of a frequency representative of the actual speed. A trigger pulse generator 13 produces a series of trigger pulses whose repetition frequency is equal to the a.c. signal frequency. The error signal producing circuit is operable with electric power of a source voltage V supplied from a power source 15 and comprises a rectangular pulse generator 16, such as a monostable multivibrator, supplied with the electric power and the trigger pulses from trigger pulse generator 13 for producing a rectangular signal of a predetermined pulse width, a pulse height linearly proportional to the source voltage V, and a frequency variable in synchronism with the trigger pulses. The duty cycle or factor of the rectangular signal is thus determined by the frequency of the a.c. signal. A preferred example of the rectangular pulse generator 16 will be described later with reference to FIG. 2. After being linearly divided by a first potential divider 17, which may be of the resistance type, the rectangular signal is averaged by an integrator 18 to become a variable signal of a variable or average voltage $V_{av}$ which depends on the potential-divided pulse height and the duty cycle of the rectangular signal and is linearly proportional to the source voltage V and to the duty cycle provided that the pulse width remains constant. The integrator 18 may comprise a capacitor and one of the potentiometer resistors (FIG. 2). On the other hand, a second potential divider 20, which may either be fixed or adjustable, linearly divides the source voltage V to derive a reference signal of a reference or standard voltage $V_s$ indicative of the predetermined speed. The circuit further comprises a comparator 25 for comparing the variable and reference signals to derive the error signal of an error voltage equal to the difference between the two voltages $V_{av}$ and $V_s$. The error signal may be amplified by an amplifier 26 and thereafter supplied to the control circuit 11. What should be noted here is that the variable and reference voltages $V_{av}$ and $V_s$ are linearly proportional to the source voltage V so that the error voltage is independent of a possible change or fluctuation in the source voltage V particularly when the motor speed is nearly equal to the predetermined speed and accordingly when the error voltage is approximately equal to zero.

Referring now to FIG. 2, the rectangular pulse generator 16 is in effect a transistorized monostable multivibrator triggered by the trigger pulses to produce the rectangular signal of a pulse width immune to a possible change in the source voltage V and an inevitable change in the ambient temperature and of a pulse height determined by the source volage V rather than by the source voltage V and the saturated collector-emitter voltage. The rectangular pulse generator 16 is operable with the main electric power of the source voltage V and with an additional power source of a higher voltage V'. The source voltage V may be 5 volts. The higher voltage V' should be a value at least equal to the sum of about twice the usual forward base-emitter voltage drop plus the source voltage V and may for example be 8 volts.

Referring in detail to FIG. 2, the rectangular pulse generator 16 comprises a trigger transistor 31 which beomes conductive to render other transistors operable only when transistor 31 is supplied with each trigger pulse. The transistor 31 is supplied with the additional power through a collector resistor 32 and a first current supply transistor 33 having its collector connected to its base and to the resistor 32. When transistor 31 is saturated, the current flowing through the current supply transistor 33 is determined by the resistor 32 and may be deemed to be a predetermined current. A second current supply transistor 34 forming a transistor pair with the transistor 33, is rendered conductive by the predetermined current. When the transistors 33 and 34 have substantially identical characteristics, the current flowing through the second currect supply transistor 34 is substantially equal to that flowing through the first current supply transistor 33 and flows through a series connection of first, second, and third resistors 36, 37, and 38 and through branches connected parallel to the second and third resistors 37 and 38. The rectangular pulse generator 16 further comprises first and second output voltage transistors 41 and 42. The emitter electrodes of transistors 41 and 42 are respectively connected to the power source 15 and to an output voltage point 43 which, in turn, serves as to the common terminal between the first resistor 36 with the second resistor 37. The base electrodes of transistors 41 and 42 are connected together and to the common point of connection between the first resistor 36 and the collector of second current supply transistor 34. The collector of the first output voltage transistor 41 directly connected to its base. The collector of the second output voltage transistor 42 is supplied with the additional power V'. The current flowing through the second current supply transistor 33 turns the output voltage transistors 41 and 42 on. The common base potential of the output voltage transistors 41 and 42 becomes equal to the source voltage V plus the forward base-emitter voltage drop of the first output voltage transistor 41. The current flowing through the second output voltage transistor 42 flows through the second and third resistors 37 and 38 and through the branches coupled thereto. It follows therefore, when the output voltage transistors 41 and 42 have substantially identical characteristics, that the emitter potential of the latter transistor 42 and the potential at the point 43 are rendered equal to the common base potential minus the forward base-emitter voltage drop of the latter transistor 42 and consequently equal to the source voltage V irrespective of the ambient termperature which equally contributes to the forward base-emitter voltage drops of the respective transistors 41 and 42.

Further referring to FIG. 2, the rectangular pulse generator 16 comprises a current holding transistor 45 rendered conductive by the voltage derived by dividing the potential on the output voltage point 43 by the second and third resistors 37 and 38. The emitter of transistor 45 is grounded through an emitter resistor 46 while the collector of transistor 45 is connected to the collector of the first current supply transistor 33. The current flowing through the transistor 45 is determined by the potential-divided voltage applied to its base, the emitter resistor 46, and its forward base-emitter voltage drop and is supplied to the current supply transistors 33 and 34 to assure that transistors 33 and 34 continue to serve as constant-current sources even after disappearance of the trigger pulse. The rectangular pulse generator 16 further comprises a capacitor 47 and a charging resistor 48 supplied with the potential at the point 43. The rectangular pulse generator 16 still further comprises a switching transistor 49 connected differentially with respect to the holding transistor 45 between the point 43 and the emitter resistor 46. The base potential rises along the charging curve for the capacitor 47 until the switching transistor 49 turns on to raise, in turn, the holding transistor emitter potential to a value where the latter transistor 45 becomes nonconductive to switch off the current supply transistors 33 and 34 and to suddenly switch the potential at point 43 to zero form the source voltage V hitherto placed thereon. The source voltage V appearing at point 43 is used to provide the base potentials for both the holding and switching transistors 45 and 49. When transistors 45 and 49 have substantially identical characteristics, the ambient temperature has no effect on these base potentials. The interval between switching on and off of the current supply transistors 33 and 34, namely, the pulse width of the rectangular oscillation, is therefore dependent solely on the time constant for charging the capacitor 47 through the charging resistor 48.

Still further referring to FIG. 2, the first potential divider 17 and integrator 18 of FIG. 1 comprises resistors 51 and 52 and a capacitor 53. The second potential divider 20 comprises resistors 56 and 57. The comparator 25 comprises a pair of transistors 61 and 62 controlled by the variable and reference voltages $V_{av}$ and $V_s$, respectively. The emitter electrodes are grounded through a common resistor 63. So long as the variable and reference voltages $V_{av}$ and $V_s$ are equal to each other, the collector currents are also equal to each other. When one of the voltages $V_{av}$ and $V_s$ tends to rise higher than the other, the collector current of the transistor 61 or 62 having the higher base potential grows larger than the other collector current. If the resistance of common resistor 63 is sufficiently high, the common emitter current may be deemed to be constant. Consequently, an amplified difference voltage is developed as the error signal across a resistor 65 provided in one of the collector circuits. It is to be noted here in order to derive the variable voltage $V_{av}$ linearly proportional to the average voltage of the rectangular oscillation that the input impedance therefor of the comparator 25 should be sufficiently high. The circuit constants may therefore be selected for an input frequency and a pulse width respectively of 300 Hz and 1 millisecond, for example, as follows:

Resistor 51: 20 kΩ,
Resistor 52: 100 kΩ,
Capacitor 53: 0.5 μF, and
Resistor 63: 3 kΩ.

Incidentally, it is possible with a high precision and yet at a reduced cost to apply semiconductor integrated circuit techniques to manufacture of error signal producing circuits according to this invention. The variations in the source voltage or voltages and in the ambient temperature are not serious for the amplifier 26, the control circuit 11, and others.

What is claimed is:

1. A negative feedback circuit for generating a control signal to be applied to a control circuit for automatically controlling the actual speed of a motor, said feedback circuit being responsive to a feedback signal having a frequency representative of the actual speed of said motor, said feedback circuit comprising:
   a rectangular pulse generator powered by a voltage source and responsive to said feedback signal for generating a rectangular signal having a predetermined pulse width, a pulse height linearly proportional to the voltage output of said voltage source, and a duty cycle determined by the frequency of said feedback signal;
   means responsive to said rectangular signal for producing a variable signal having a variable voltage linearly proportional to an average voltage of said rectangular signal and therefore proportional to both the actual speed of said motor and the actual voltage output of said voltage source;
   a potential divider for linearly dividing the output of said source voltage to derive a reference signal indicative of a predetermined desired speed of said motor;
   means for comparing said variable signal representative of the actual speed of said motor and said reference signal and for generating said control signal which is representative of a difference between said variable and reference signals and independent of any fluctuation in the voltage output of said voltage source.

2. A circuit as claimed in claim 1, wherein said feedback signal is generated by actual speed detecting means producing a train of trigger pulses of a repetition frequency representative of said actual speed, and wherein said rectangular pulse generator comprises an output terminal, a first pair of transistors of substantially identical characteristics, a second pair of transistors of substantially identical characteristics, a capacitor, first means for coupling said voltage source to one of said first pair of transistors, second means responsive to each of said trigger pulses for rendering said first pair of transistors conductive, third means for placing on said output terminal a first output voltage substantially equal to said voltage source while said first pair of transistors are conductive, fourth means responsive to said first output voltage for rendering one of said second pair of transistors conductive, fifth means responsive to turning on of said one of said one of said second pair of transistors for keeping said first pair of transistors in the conductive state even after disappearance of said each trigger pulse, sixth means responsive to said first output voltage for charging said capacitor to develop there across a rising voltage, the other of said second pair of transistors being responsive to said rising voltage to thereby become conductive, and seventh means responsive to conduction of said other of said pair of transistors for rendering said one of said second pair of transistors nonconductive and thereby turn off said pair of transistors to place on said output terminal a second output voltage substantially equal to zero, whereby said pulse width and height are given by the time constant for charging said capacitor and the voltage difference between said first and second output voltages, respectively.

3. An error pulse producing circuit as claimed in claim 2, wherein:
   said third means comprises a third pair of transistors of substantially identical characteristics, eighth means responsive to said trigger pulse for rendering said third pair of transistors conductive, and ninth means responsive to turning on of said third pair of transistors for rendering said first pair of transistors conductive, and said fifth means further comprising means responsive to turning on of said one of said second pair of transistors for keeping said third pair of transistors in the conductive state even after disappearance of said each trigger pulse whereby said first pair of transistors are kept in the conductive state.

4. Means for controlling the speed of motors and like rotating means comprising:
   detector means for generating an a.c. signal whose frequency is proportional to the speed of the rotating means;
   means responsive to said a.c. signal for generating trigger pulses whose frequency is proportional to the speed of said rotating means;
   a voltage source;

means powered by said voltage source and responsive to said trigger pulses for generating rectangular pulses whose amplitude is proportional to the output of said source voltage, whose frequency is proportonal to said a.c. signal and whose pulse duration is substantially constant;

means for generating an average voltage representative of the average output of said rectangular pulse generating means;

voltage divider means coupled to said voltage source for providing a reference voltage representative of a predetermined speed of said rotating means;

comparator means responsive to said reference voltage and said average voltage to generate a difference signal representative of the difference between the actual and predetermined speed of said rotating means;

means responsive to said difference signal for controlling said rotating means to operate at a speed determined by said reference voltage;

said rectangular pulse generating means including means for compensating for fluctuation in said source voltage to cause said comparator means to develop a difference signal which is unaffected by fluctuations in said source voltage.

5. The control means of claim 4, wherein said rectangular pulse generating means is further comprised of:

first constant current supply means coupled to said source;

second constant voltage supply means coupled to said source and being energized only when said first means is energized;

means for converting said a.c. signal into trigger pulses;

third means activated responsive to said trigger pulses for energizing said first means;

fourth means activated to a first state responsive to the output of said second means for maintaining said first means energized even after said third means is deactivated by removal of said trigger pulses;

fifth means being charged when said second means is energized to change said fourth means to a second operating state when said fifth means reaches a predetermined threshold;

said first means being deenergized by said fourth means when said fourth means is driven to said second state;

the output of said second means being proportional to said source voltage when said first means is energized and being substantially zero volts when said means is deenergized to thereby generate said rectangular pulses of a pulse width determined by the time required for said charging means to charge to said predetermined threshold.

* * * * *